United States Patent [19]

Huang et al.

[11] Patent Number: 5,067,681
[45] Date of Patent: Nov. 26, 1991

[54] COPY HOLDER

[75] Inventors: Ali Huang; Philips Tsai; Bonbo Chen, all of Taipei, Taiwan

[73] Assignee: Acer Incorporated, Hsin Chu, Taiwan

[21] Appl. No.: 450,000

[22] Filed: Dec. 13, 1989

[51] Int. Cl.⁵ .............................................. A47F 37/14
[52] U.S. Cl. ................................ 248/442.2; 248/918; 248/316.7; 400/718
[58] Field of Search ............... 248/442.2, 316.7, 231.8, 248/229, 918, 289.1; 312/7.2; 400/718

[56] References Cited

U.S. PATENT DOCUMENTS

| | | | |
|---|---|---|---|
| 1,615,959 | 2/1927 | Slavik | 248/442.2 |
| 2,599,303 | 6/1952 | Ward | 248/231.8 X |
| 3,322,381 | 5/1967 | Bubb | 248/229 X |
| 3,399,923 | 9/1968 | Bornefeld et al. | 248/289.1 X |
| 4,197,026 | 4/1980 | Vorbach et al. | 248/442.2 X |
| 4,332,362 | 6/1982 | Leopold | 248/229 X |
| 4,693,443 | 9/1987 | Drain | 248/918 X |
| 4,747,572 | 5/1988 | Weber | 248/442.2 |
| 4,902,078 | 2/1990 | Judd | 248/918 X |

Primary Examiner—Alvin C. Chin-Shue
Attorney, Agent, or Firm—James S. Hsue

[57] ABSTRACT

The copy holder described is particularly suitable for use in information entry by means of a keyboard and computer monitor. The copy holder is of simple design and includes a clip, a connecting rod and two rod stands for connecting the rod to supporting surfaces. The rod stands are provided with foam rubber. This copy holder is compact, convenient for the user, and easy to manufacture.

5 Claims, 3 Drawing Sheets

1

COPY HOLDER

BACKGROUND OF THE INVENTION

This invention relates to copy holders and in particular to copy holders suitable for use for holding papers containing information next to computer monitors convenient for information entry.

With the advent of computer technology, much of information recording and processing are now performed with the aid of computers. A large amount of data and information must be first entered before the information can be recorded or processed. The information or data entry is frequently done by the user using a keyboard and a computer monitor. The computer monitor and keyboard are usually placed on a surface such as a desk and the information or data to be entered usually appears in written or printed form on sheets of paper or copies.

Frequently, the user performing the information entry would simply place the copy or sheet containing the information to be entered on the same surface that supports the keyboard and computer monitor. This would require the user to continuously glance at the sheet or copy which are at different elevations than the computer monitor. The person's eyes are therefore required to move back and forth between the computer monitor and the sheet or copy which are at different elevations. This increases user fatigue. Furthermore, since the information to be entered does not appear side-by-side to the computer monitor, this increases the chances of human error and errors in information entry. It is therefore desirable to provide an apparatus which enables the sheet or copy containing information to be entered to be placed next to the computer monitor.

Various solutions have been proposed to the above problem. Most of the solutions take their cue from devices such as book stands used for holding a book in an upright position on a desk. While book stands are suitable for the purposes for which they are intended, they are not suitable as copy holders for information entry into computers in a manner described above. They are inconvenient and occupy valuable space on the desktop. The products now commercially available include the suspension arm type, the desktop type, and the simple attachment type. However, none of these devices is entirely satisfactory. It is therefore desirable to provide an improved copy holder particularly suitable for holding sheets of paper or copies next to a computer monitor for information entry.

SUMMARY OF THE INVENTION

This invention is directed to a holder for at least one sheet of paper adjacent to a surface where the sheet has a top end and an upright position. The holder comprises an elongated clip adapted for clipping the top end of the sheet. The clip has a first end and a second end. The holder also includes means connected to the surface for supporting the first end of the clip such that said clip is in a substantially horizontal position to clip the top end of the sheet and to support the sheet in an upright position for a person to read.

DETAILED DESCRIPTION OF THE INVENTION

Figure 1:
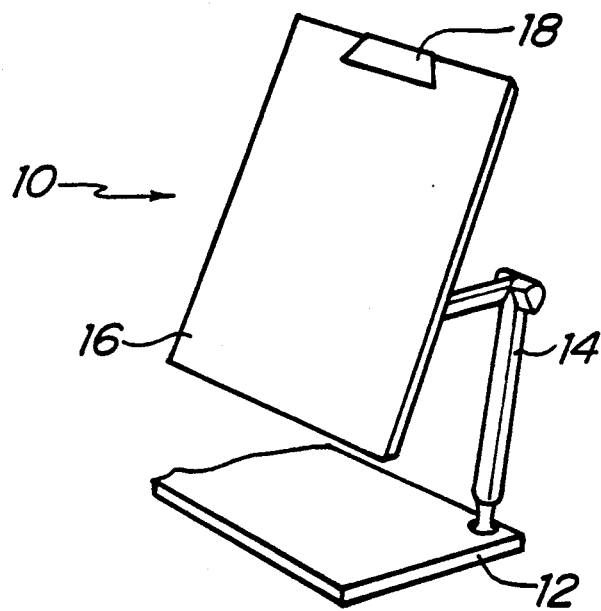
FIG. 1 is a perspective view of a portion of a suspension arm type copy holder to illustrate a conventional design.

FIG. 1 is a perspective view of a copy holder illustrating the suspension arm type copy holder to illustrate a conventional design. As shown in FIG. 1, the suspension arm type copy holder 10 includes a base 12, a suspension arm 14 connected to and supported by the base at one end, and a flat plate 16 connected to and supported by the other end of arm 14. Plate 16 has a spring-loaded clip 18 for clipping sheets of paper and for maintaining these sheets in position on plate 16. Such copy holder designs are bulky and occupy considerable desktop space. In order to place the sheets in place or to remove them, a person must use both hands to accomplish the task. Furthermore, such design is complicated and requires many parts so that the design is expensive to manufacture. The spring for loading clip 18 also has limited life.

Figure 2A:
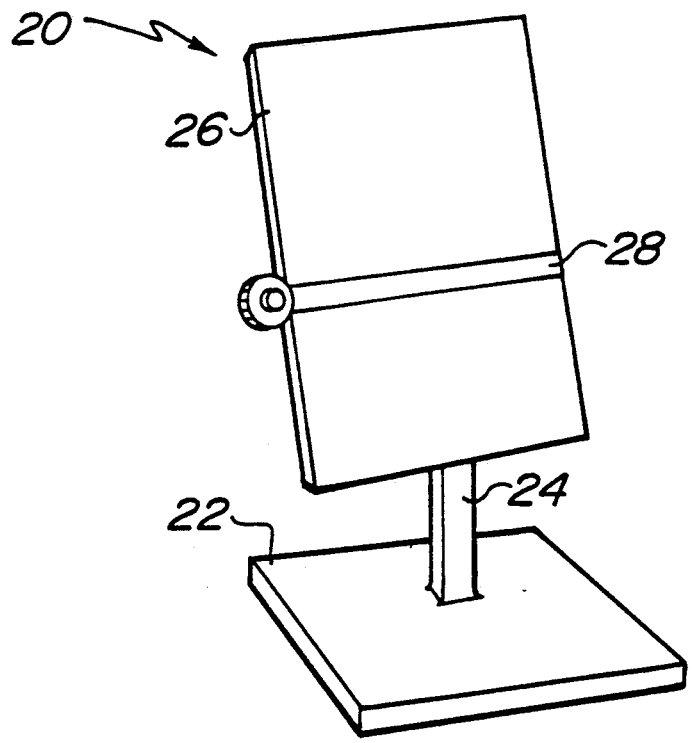
FIGS. 2A, 2B are perspective views of copy holders illustrating a desktop copy holder to illustrate another conventional design.
Figure 2B:
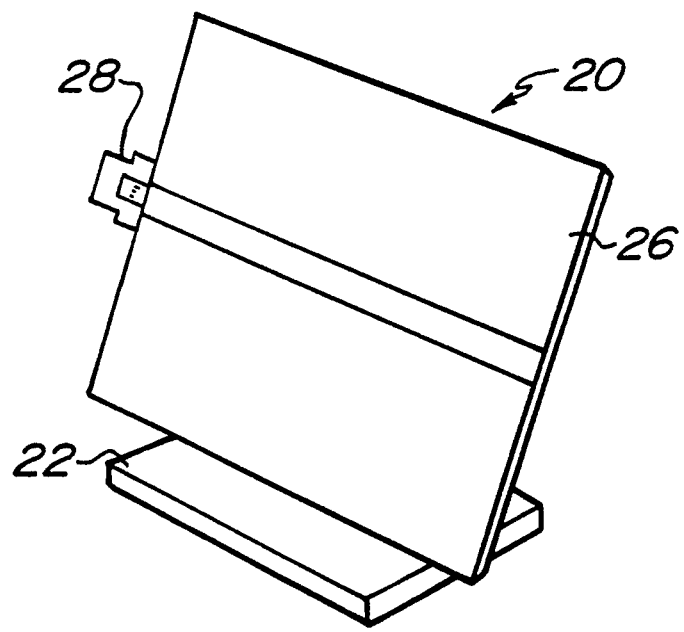

FIGS. 2A, 2B are perspective views of desktop type copy holders to illustrate another conventional design. As shown in FIGS. 2A, 2B, the desktop type copy holder 20 each includes a base 22, post 24 supported by the base, and a flat plate 26 supported by the post. A clip mechanism 28 attached to plate 26 maintains sheets of paper stationary for reading. Again the desktop design shown in FIGS. 2A, 2B are bulky and takes up precious desktop space next to a computer monitor. The user must also use one hand to adjust the clip 28 and the other hand to insert or retrieve papers between clip 28 and plate 26. This is inconvenient for the user, particularly when a large number of papers need to be held by the holder or retrieved from the holder. Furthermore, since the position of plate 26 is not usually adjustable relative to the base 22, plate 26 is usually located at a considerable distance from a computer monitor. Therefore, when a person is entering information from papers on plate 26 to a computer, the person's eyes must glance back and forth between plate 26 and the monitor which are at a considerable distance apart. This renders it more difficult for the person to concentrate and increases fatigue, particularly fatigue at the neck.

Figure 3:
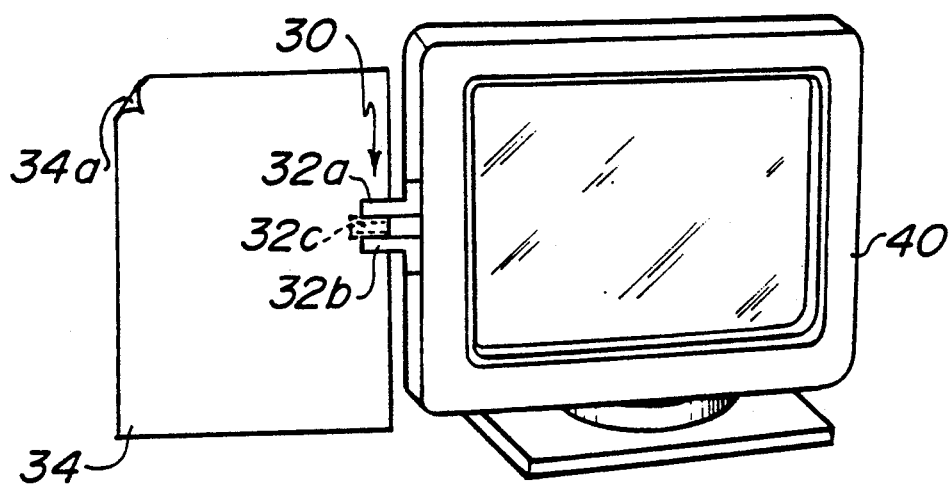
FIG. 3 is a perspective view of a simple attachment type copy holder to illustrate yet another conventional design.

FIG. 3 is a perspective view of a computer monitor and a simple attachment type copy holder to illustrate yet another conventional design. As shown in FIG. 3, copy holder 30 is adapted to be attached to a side of a computer monitor 40. Holder 30 has three fingers 32a, 32b, and a third finger 32c shown in dotted lines behind page 34. Thus page 34 is clipped between fingers 32a, 32b in front of the page and finger 32c behind the page.

In contrast to copy holders 10 and 20 of FIGS. 1, 2A, 2B, copy holder 30 is not bulky and is simple in construction. However, fingers 32a, 32b, 32c are normally rather short and do not extend to a length commensurate with the width of a normal size typing paper that is 8½" in width. Therefore, as illustrated in FIG. 3, the top portion 34a of sheet 34 tends to bend over, thereby obscuring from the reader's view the information on sheet 34. In addition, since the fingers are relatively short, the frictional force between the fingers and sheet 34 may be inadequate for holding the sheet steady for a long period of time, particularly where the fingers are used to hold a number of sheets at the same time.

Thus none of the conventional designs described above is entirely satisfactory. It is therefore desirable to provide a reliable and inexpensive copy holder where the above-described difficulties are overcome.

Figure 4:
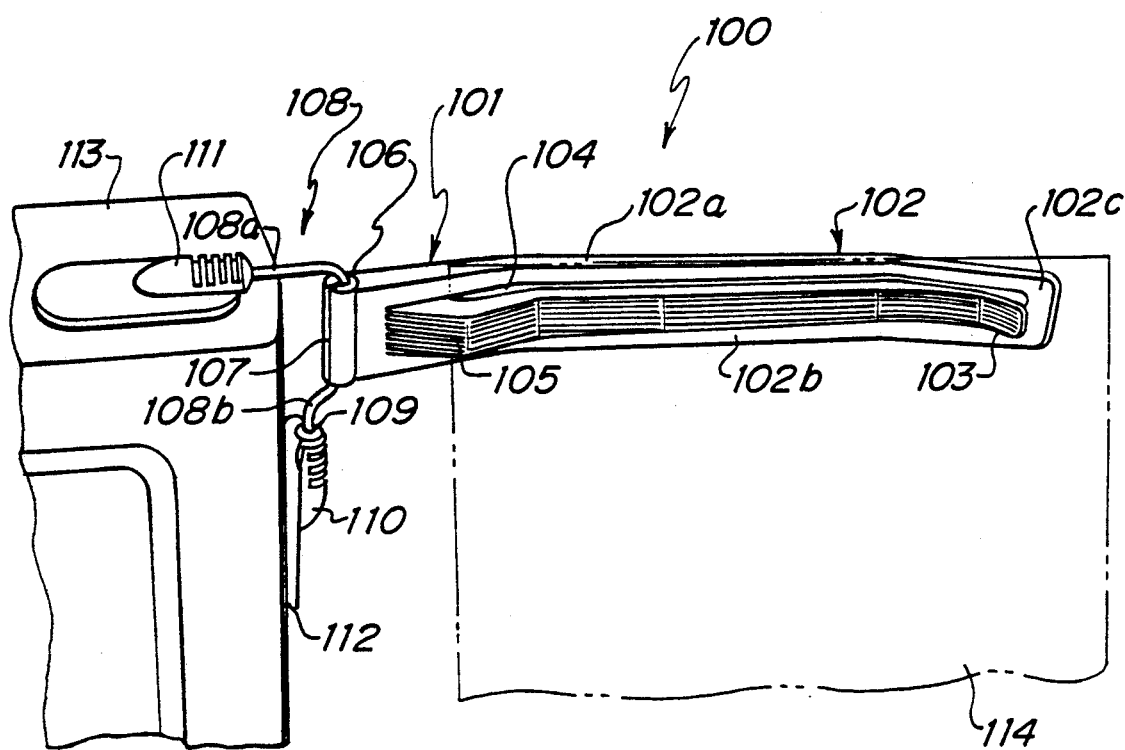
FIG. 4 is a perspective view of a copy holder and a portion of a computer monitor to illustrate the preferred embodiment of the invention.

FIG. 4 is a perspective view of a copy holder 100 and a portion of a computer monitor 113 to illustrate the preferred embodiment of the invention. As shown in FIG. 4, copy holder 100 is adapted to be attached to any surface convenient for the user, such as the top and side surfaces of a computer monitor 113. As shown in FIG. 4, holder 100 includes a supporting body 101 which is in essence a clip, a connecting rod 108, and rod stands 110, 111 for attaching rod 108 to supporting surfaces of the monitor 113. Clip 101 is made of a durable material such as hard plastic. Clip 101 includes a back member 102 and a front member 103. In the preferred embodiment, the back member 102 has two arms 102a, 102b connected at end 102c. Thus the two arms 102a, 102b of the back member are separated from each other by a space 104. The front arm 103 is of such a shape and size and located such that at least a portion of the member close to end 102c of the back member fits into the space 104 when no paper is clipped by clip 101. Hence when one or more sheets of paper 114 are forcibly inserted between the front and back members, the portion of front member 103 that fits and protrudes into space 104 is forced to move away from member 102, so that the sheet or sheets of paper inserted are securely clipped in between the front and back members.

As shown in FIG. 4, members 102, 103 are of such a length that they are particularly adapted to hold the top end portion of one or more sheets or typing paper that are 8½" in width. To provide adequate friction between the members and sheets 114, it is desirable for members 102, 103 to be as long as the width of the sheet normally used, or about 8½". On the other hand, members 102, 103 which are too long may be inconvenient for the user since they would extend for a considerable distance away from monitor 113. Thus as shown in FIG. 4, members 102, 103 are preferably just a bit shorter than the width of a typical typing sheet 114, such as about eight inches.

Front member 103 has grooves 105 therein and is therefore constructed to retain its function for clipping sheet 114 over long periods of use and to minimize the effects on such function of fatigue of the material used for constructing clip 101. With such construction, clip 101 is not easily broken. Clip 101 is supported at the other end 106 by rod 108. End 106 of clip 101 is in the shape of a cylinder having an axis where the cylinder is split along a substantially axial direction forming an opening 107. Rod 108 is insertable into cylinder 106 through opening 107 and is shown in FIG. 4 as having been inserted into cylinder 106 through opening 107.

Rod 108 is of such dimensions that friction between the rod and cylinder 106 maintains the clip 101 and sheets 114 in substantially stationary positions unless the clip 101 is pushed, and that the positions of the clip and sheets 114 are alterable by pushing the clip to rotate the cylinder 106 relative to the rod to overcome the friction between the rod and the cylinder. Opening 107 is also rather small relative to rod 108 so that the combined weight of clip 101 and sheet 114 is unlikely to cause rod 108 to be separated from cylinder 106.

Rod stands 110 and 111 each has holes (such as hole 109) into which rod 108 may be inserted. Rod 108 is generally L-shaped as shown in FIG. 4. Stands 110, 111 each has an adhesive bottom for attachment for the top and side surfaces of monitor 113. Preferably, stands 110 and 111 each is provided with a layer of foam rubber 112 on which adhesives have been provided for adhering to monitor 113. Stands 110, can therefore be conveniently attached to the top and side surfaces of monitor 113 as shown. After such attachment, a person may easily remove device 100 by cutting through the foam rubber 112 and attach stands 110, 111 to other surfaces as desired. The adhesive left on the top and side surfaces of monitor 113 may be simply scraped off. Thus the user may attach device 100 on both sides of the monitor or change the position of device 100 relative to the monitor at any time as desired.

Device 100 is designed for convenient use by the user. Thus the user may insert one or more sheets of paper 114 into clip 101 by one hand without requiring the use of both hands. In contrast to device 30 of FIG. 3, clip 101 extends over most of the width of the top end of sheets 114. In this manner, sufficient frictional force is provided between sheets 114 and clip 101 to maintain sheets 114 in position. Furthermore, since device 100 clips the top ends of sheets 114, sheets 114 will not fold over to obscure the information thereon, unlike device 30. The construction of device 100 also renders it easy for the user to flip over a page after the information thereon has been entered to render the information on the next page underneath visible. Device 100 is particularly suitable for holding several sheets of paper at a time.

Rod 108 has two arms 108a, 108b connected together forming a generally L-shaped configuration. Rod 108 is constructed with such a material that the angle between arms 108a, 108b may be changed so that the two arms are substantially parallel to the surfaces to which they are to be attached. As shown in FIG. 4, the top and side surfaces of monitor 113 are at approximately 90°, so that arms 108a, 108b are also at about 90° to each other. With such construction, it is possible to push and move clip 101 relative to rod 108 without causing rod 108 to become loose and dislodged from stands 110, 111. If the surfaces to which arms 108a, 108b are to be attached are not at right angles, it is possible to bend the two arms relative to each other to change the angle therebetween so that again arms 108a, 108b are located so that they will not become loose or dislodged from stands 110, 111 despite the movement of clip 101. In most cases this is accomplished by changing the angle between the arms so that the two arms are substantially parallel to the two surfaces to which the two arms are to be attached.

While the invention has been illustrated in reference to a preferred embodiment, it will be understood by those skilled in the art that various modifications and improvements may be made without departing from the scope of the invention which is to be limited only by the appended claims.

What is claimed is:

1. A holder for holding at least one sheet of paper in an upright position for exhibiting the information contained thereon, said holder comprising:
   an elongated clip adapted for clipping an end of the sheet of paper thereto, said elongated clip having, a first end and a second end, said first end forming a cylinder, said cylinder having an axis and being split along a substantially axial direction to form an opening; and supporting means for supporting said elongated clip, said supporting means including a rod being removably inserted into said cylinder via said opening, said supporting means comprising:
  a first attachment member connected to a first end of said rod and adhering to a first surface, and
  a second attachment member connected to a second end of said rod and adhering to a second surface, said first end of said rod being substantially perpendicular to said second end of said rod.

2. A holder as defined in claim 1 wherein said elongated clip comprises:
  a back member having a slot therein; and
  a front member having a portion which protrudes into said slot in said back member, so that the two members securely clip an end of the at least one sheet therebetween.

3. A holder as defined in claim 2 wherein said front member further includes a surface for contacting the sheet and defines a plurality of grooves on said surface to increase friction between the surface and the at least one sheet.

4. A holder as defined in claim 2, said sheet having an end held by the holder, wherein said front and back members are elongated and extend across substantially the entire length of the end of the sheet.

5. A holder as defined in claim 1 wherein:
  said rod is composed of a flexible material such that the angle between said first and said second end of said rod is adjustable.

* * * * *